July 19, 1932.  C. B. SMALTS  1,868,371
PLANT STAKE
Filed Oct. 16, 1931  2 Sheets-Sheet 2
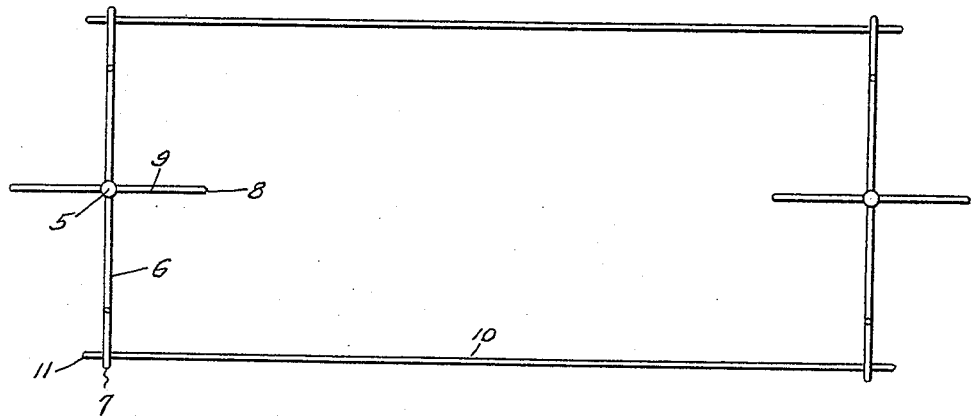
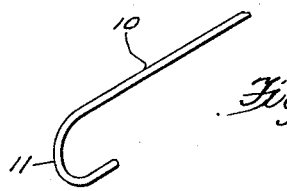
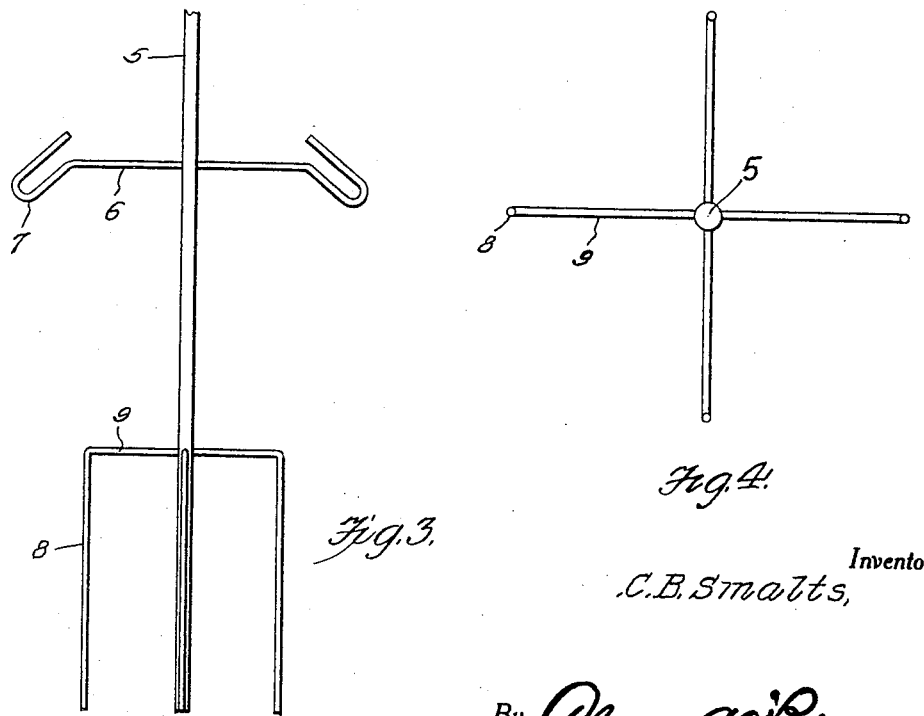
Inventor
C. B. Smalts,
By Clarence A. O'Brien
Attorney Patented July 19, 1932

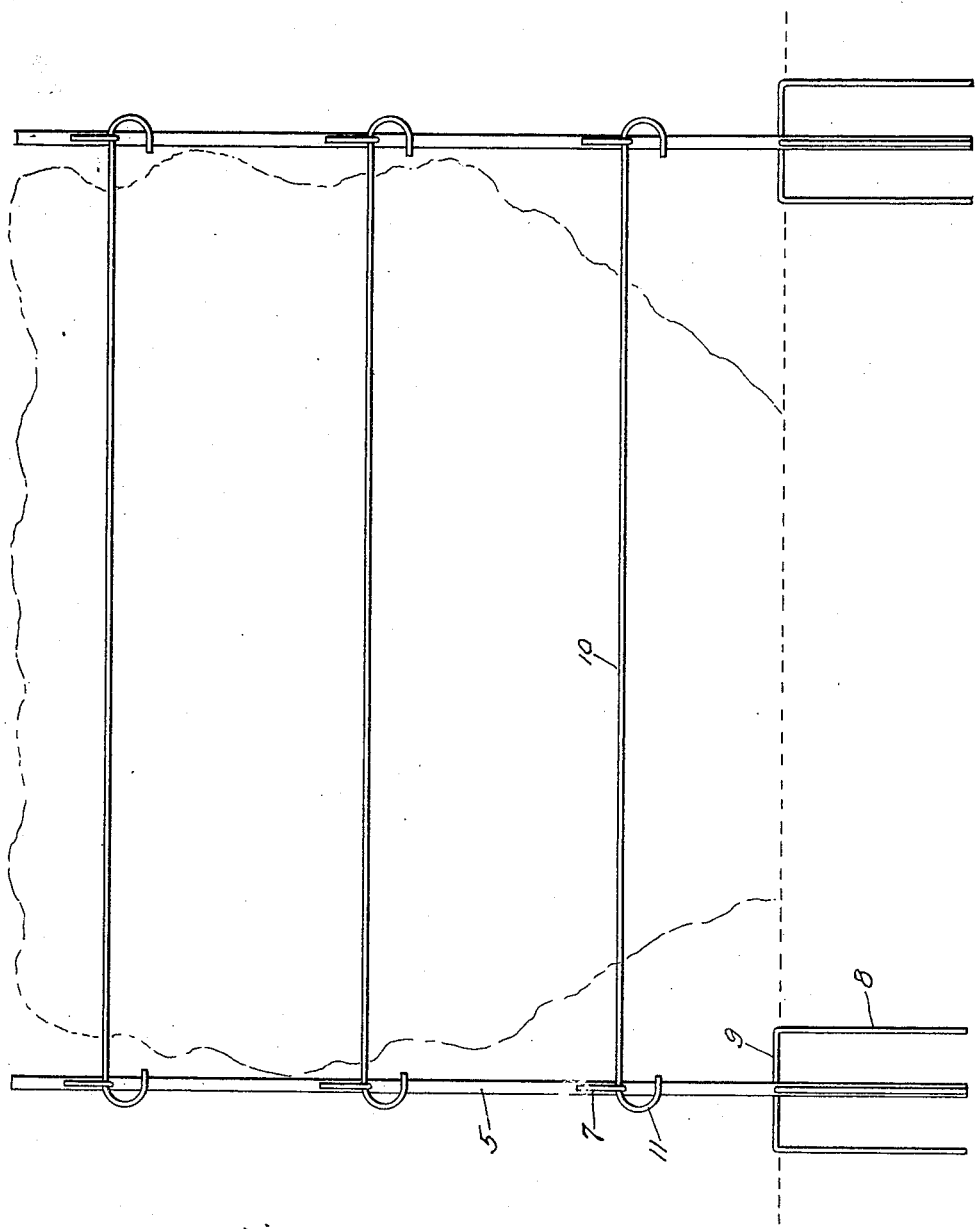

1,868,371

UNITED STATES PATENT OFFICE

CLAUDE B. SMALTS, OF WINCHESTER, VIRGINIA

PLANT STAKE

Application filed October 16, 1931. Serial No. 569,282.

The present invention relates to a stake for supporting plants in rows either in greenhouses or gardens and the object of the invention is to provide a stake of this nature which is exceedingly simple in its construction, inexpensive to manufacture, easy to manipulate, and thoroughly efficient and reliable in use and operation.

In the drawings:

Figure 1 is a side elevation of a pair of stakes embodying the features of my invention.

Figure 2 is a top plan view thereof.

Figure 3 is a side elevation of a stake taken at right angles to those shown in Figure 1 with the upper portion of the stake broken away.

Figure 4 is a bottom plan view of one of the stakes, and

Figure 5 is a perspective view of one of the side bars.

Referring to the drawings in detail it will be seen that each stake includes an elongated shank 5 having a plurality of pairs of arms 6 extending therefrom at right angles thereto and terminating in hook 7. A plurality of prongs 8 are formed with inwardly directed right angular extensions 9 at their upper ends connected to the shank 5 to be forced into the ground for supporting the shank 5 in an upright position with the arms 6 at right angles to the row of plants.

Bars 10 with hook ends 11 are engaged in the hooks 7 and the plants grow up between these bars 10 and the stake.

It is thought that the construction, utility and advantages of this invention will now be clearly understood without a more detailed description thereof.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus for supporting plants comprising a pair of spaced upright shanks, said uprights having spaced arms extending therefrom terminating in inwardly bent hooks, transversely extending side bars in said hooks having hooked ends for preventing lateral movement thereof, a plurality of prongs arranged at right angles to one another and about the lower ends of each of said shanks, having inwardly directed right angular extensions at their upper ends fixed to said shanks.

In testimony whereof I affix my signature.
CLAUDE B. SMALTS.